(12) United States Patent
Holalkere et al.

(10) Patent No.: US 6,741,465 B2
(45) Date of Patent: May 25, 2004

(54) COOLING METHOD AND APPARATUS FOR HANDHELD DEVICES

(75) Inventors: Ven R. Holalkere, Dublin, CA (US); Barrett M. Faneuf, Lakewood, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/112,633

(22) Filed: Mar. 29, 2002

(65) Prior Publication Data

US 2003/0184967 A1 Oct. 2, 2003

(51) Int. Cl.⁷ .................................................. G06F 1/20
(52) U.S. Cl. ........................ 361/687; 361/683; 361/695; 165/185; 165/80.3; 713/300; 713/322
(58) Field of Search ............................... 361/680–683, 361/687, 695, 696; 165/80.3, 185, 80.4; 713/300, 320–322

(56) References Cited

U.S. PATENT DOCUMENTS

| | | | | | |
|---|---|---|---|---|---|
| 5,898,569 | A | * | 4/1999 | Bhatia ......................... | 361/700 |
| 5,974,556 | A | * | 10/1999 | Jackson et al. ............. | 713/322 |
| 6,275,945 | B1 | * | 8/2001 | Tsuji et al. .................. | 361/687 |
| 6,459,575 | B1 | * | 10/2002 | Esterberg .................... | 361/687 |
| 6,532,152 | B1 | * | 3/2003 | White et al. ................ | 361/692 |
| 6,563,703 | B2 | * | 5/2003 | Xie ............................. | 361/687 |

\* cited by examiner

*Primary Examiner*—Lisa Lea-Edmonds
(74) *Attorney, Agent, or Firm*—Mark V. Seeley

(57) ABSTRACT

A method and apparatus for cooling an electronic component within a handheld device comprised of an extension to the casing of the handheld device and at least one portion of a cooling apparatus within the extension.

30 Claims, 7 Drawing Sheets

COOLING METHOD AND APPARATUS FOR HANDHELD DEVICES

FIELD OF THE INVENTION

The present invention is related to method and apparatus to aid in cooling a handheld device.

ART BACKGROUND

Handheld electronic devices, such as handheld computers, continue to increase in performance and capability as ever faster processors, memory and other components are used. However, these increases in performance and capability often come with the requirements of higher power consumption and/or higher heat dissipation by components within the handheld devices.

One of the key features making the use of handheld devices so desirable, is their small size and light weight, since as the name suggests, they are designed to be small enough to hold in one hand during use. However, as a result of being so small and light, handheld devices often have no room for the varieties of cooling apparatus that can often be found in more stationary electronic devices that perform similar functions. This can prevent the use of higher performing components of the variety often found in such stationary electronic devices in a handheld device, because such higher performing components often generate more heat than can be accommodated within a handheld device.

As a result, handheld devices often cannot have the same level or range of capabilities as more stationary electronic devices that perform similar functions, because this reduced ability to cool components often requires that compromises be made in the levels of performance and/or capability.

BRIEF DESCRIPTION OF THE DRAWINGS

The objects, features, and advantages of the present invention will be apparent to one skilled in the art in view of the following detailed description in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention, and that numerous details may be changed without departing from the spirit and scope of the invention as hereinafter claimed.

The present invention concerns methods and apparatus to cool a handheld device. Specifically, various embodiments of the present invention relate to providing a handheld device with an integrated cooling system to conduct heat away from one or more components within a handheld device. However, although the present invention is discussed with reference to a handheld device comprised, at least in part, of electronic circuitry of the variety commonly referred to as a "personal data assistant" (i.e., PDA) or handheld computers, it will be understood by those skilled in the art that the present invention may be applied to the cooling of other varieties of handheld devices including "tablet" computers, portable radios, cellular telephones, pagers, portable "websurfing" devices, portable media players (such as portable disk media players), remote controls, calculators, language translators, electronic dictionaries, electronic picture viewers, GPS receivers, electronic compasses and mapping devices, handheld radar devices or other scanning devices such as so-called "stud finders," etc., as well as hand-carryable medical devices for examining a patient, such as a digital thermometer. Furthermore, although the present invention is discussed with reference to incorporating cooling apparatus within substantially hand-carryable or handheld devices, those skilled in the art will appreciate that the present invention may be applied to other devices meant to be easily portable by virtue of their small size and/or weight, such as so-called "wearable" electronic devices, i.e., devices strapped to the wrist, arm, leg, back or other parts of the body of a user.

Figure 1:
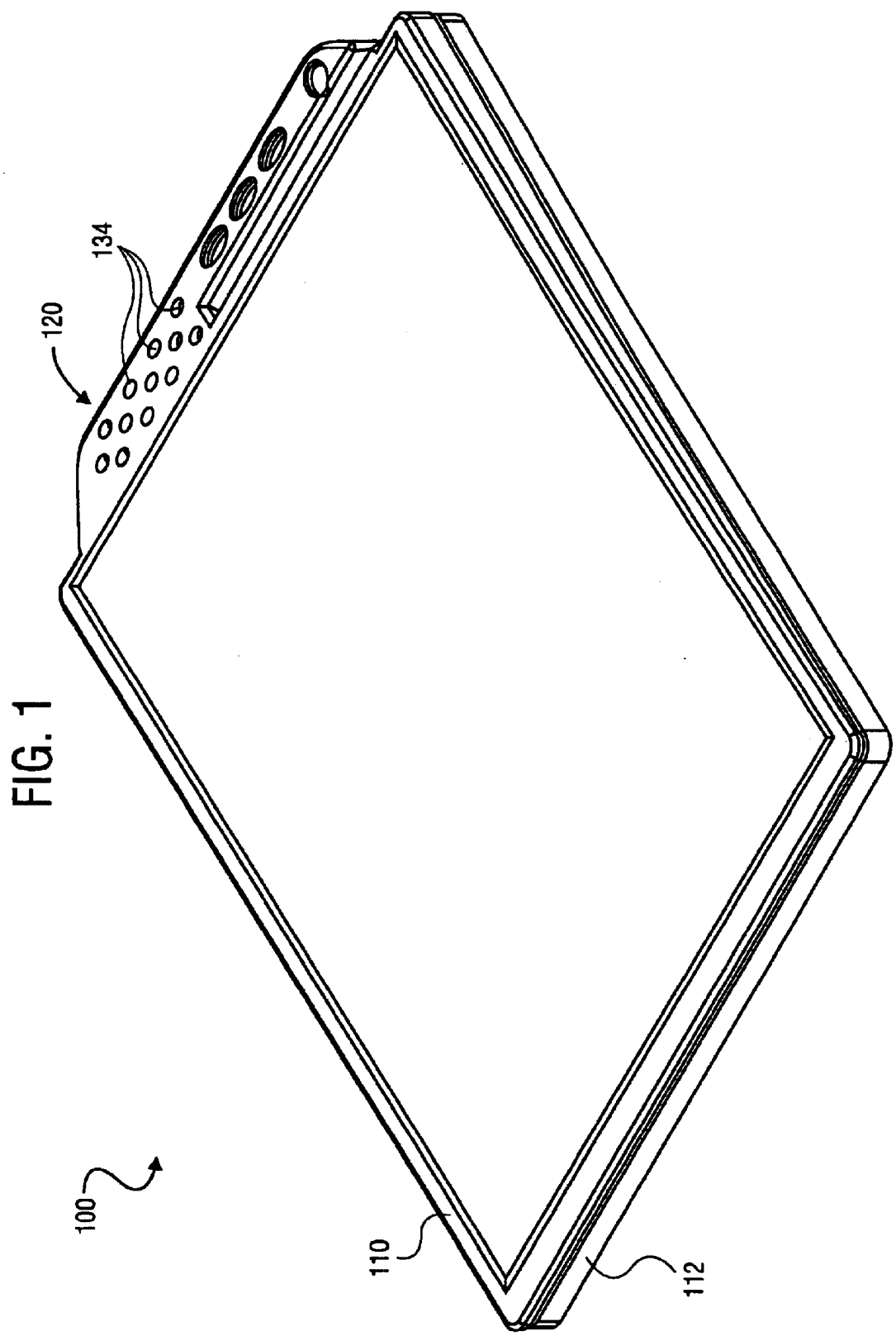
FIG. 1 is a perspective view of one embodiment.

FIG. 1 is a perspective view of one embodiment. Handheld device 100 is comprised of casing parts 110 and 112 forming a substantially flat and rectangular casing that encloses electronic circuitry (not shown) within. A portion of one or the other of casing parts 110 or 112 extend beyond the substantially rectangular shape of the casing to form extension 120 with holes 134 to facilitate the functioning of a cooling apparatus (not shown), to aid in the cooling of at least one component of the electronic circuitry within handheld device 100. Depending on the functions intended to be performed by handheld device 100, one or more external surfaces of the casing may carry buttons, a display device, knobs, dials, a touch-sensitive pad, and/or other forms of apparatus to enable interaction by a user of handheld device 100.

The location and/or orientation of extension 120 and/or holes 134 may be such as to facilitate dissipation by convection to the environment external to handheld device 100 of heat transferred by the cooling apparatus from at least one component of the electronic circuitry within handheld device 100. Alternatively, a fan or blower (not shown) may be used within or near extension 120 to further facilitate dissipation to the environment of such transferred heat.

The location and/or orientation of extension 120 and/or holes 134 may also be chosen to minimize contact between either the cooling apparatus or the heat dissipated by the cooling apparatus and a user of handheld device 100. Furthermore, the location and/or orientation of extension 120 and/or holes 134 may also be chosen to maximize access to the ambient air of the environment external to handheld device 100. This may be done by choosing a location for extension 120 that tends to cause it to protrude into the ambient air and/or away from contact with a user of handheld device 100 when handheld device 100 is being used by the user as intended.

As shown in the embodiment depicted in FIG. 1, extension 120 may also provide a location in which may be carried one or more controls, such as buttons, lights or other devices to facilitate interaction with a user of handheld device 100. In alternate embodiments, extension 120 may provide a mounting location for an antenna and/or optical emitter or receiver to facilitate either radio frequency or optical communication. In still other alternate embodiments, extension 120 may house or provide a mounting location for one or more electrical connectors by which handheld device 100 may be attached to other devices and/or to a power source.

Figure 2:
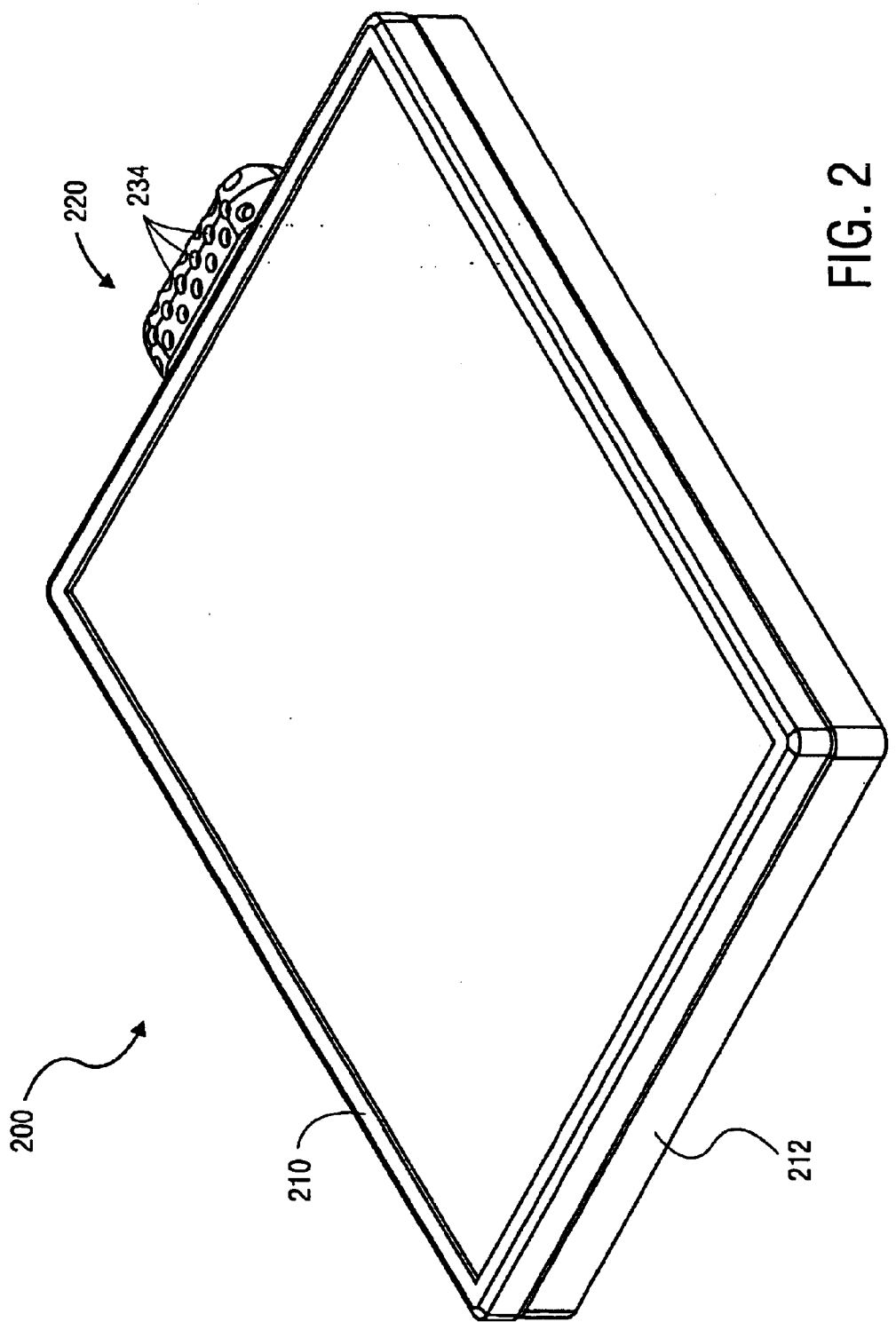
FIG. 2 is a perspective view of another embodiment.

FIG. 2 is a perspective view of another embodiment of the present invention. In a manner that generally corresponds to handheld device 100, handheld device 200 is comprised of casing parts 210 and 212 forming a substantially flat and rectangular casing that encloses electronic circuitry (not shown) within. A portion of one or the other of casing parts 210 or 212 extend beyond the substantially rectangular shape of the casing to form extension 220 with holes 234 to facilitate the functioning of a cooling apparatus (not shown), to aid in the cooling of at least one component of the electronic circuitry within handheld device 200. Depending on the functions intended to be performed by handheld device 100, one or more external surfaces of the casing may carry buttons, a display device, knobs, dials, a touch-sensitive pad, and/or other forms of apparatus to enable interaction by a user of handheld device 100.

In a manner similar to the embodiment depicted in FIG. 1, the location and/or orientation of extension 220 and/or holes 234 may be such as to facilitate dissipation by convection to the environment external to handheld device 200 of heat transferred by the cooling apparatus from at least one component of the electronic circuitry within handheld device 200. Alternatively, a fan or blower (not shown) may be used within or near extension 220 to further facilitate dissipation to the environment of such transferred heat.

Also in a manner similar the embodiment depicted in FIG. 1, the location and/or orientation of extension 220 and/or holes 234 may also be chosen to minimize contact between the cooling apparatus or the heat dissipated by the cooling apparatus and a user of handheld device 200. Furthermore, the location and/or orientation of extension 220 and/or holes 234 may also be chosen to maximize access to the ambient air of the environment external to handheld device 200. This may be done by choosing a location for extension 220 that tends to cause it to protrude into the ambient air and/or away from contact with a user of handheld device 200 when handheld device 100 is being used by the user as intended.

Figure 3:
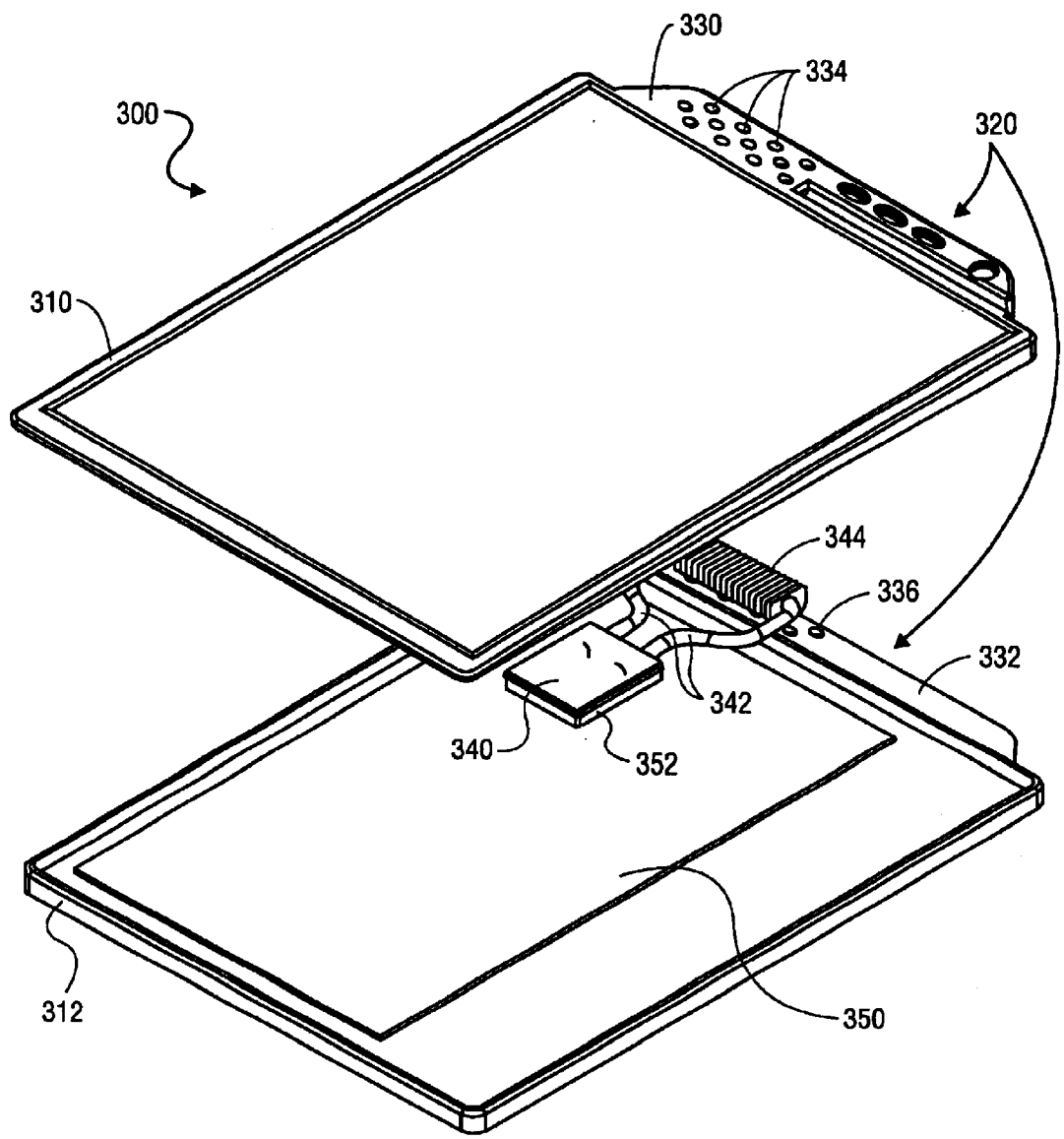
FIG. 3 is a perspective view of an embodiment with portions of the outer casing separated to reveal internal components.

FIG. 3 is a perspective view of an embodiment with portions of the outer casing separated to reveal internal components. In a manner corresponding to the embodiment depicted in FIG. 1, handheld device 300 is comprised of casing parts 310 and 312 forming a substantially flat and rectangular casing that encloses electronic circuitry, including circuit board 350 and component 352. Portions 330 and 332 of casing parts 310 and 312 extend beyond the substantially rectangular shape of the casing to form extension 320 with holes 334 and 336 to facilitate the function of a cooling apparatus comprised of evaporator 340, tubing 342 and condenser 344.

This cooling apparatus aids in the cooling of component 352. In one embodiment, the cooling apparatus is a capillary pump loop system using a wick within evaporator 340 to draw a liquid coolant from condenser 344 into evaporator 340 where heat from component 352 causes the coolant to evaporate and transfer back to condenser 344 where the coolant once again returns to liquid form as heat from component 352 is released. However, as those skilled in the art will understand, the cooling apparatus could be based on any of a variety of technologies, and despite the depiction in FIG. 3 of a cooling apparatus specifically having an evaporator and condenser, a cooling apparatus of a design using very different parts or a very different arrangement of parts may be employed.

The location and/or orientation of extension 320 and/or holes 334 and 336 may be such as to facilitate dissipation by convection to the environment external to handheld device 300 of heat transferred by the cooling apparatus from component 352. Alternatively, a fan or blower (not shown) may be employed to cause a flow of air through extension 320.

Figure 4:
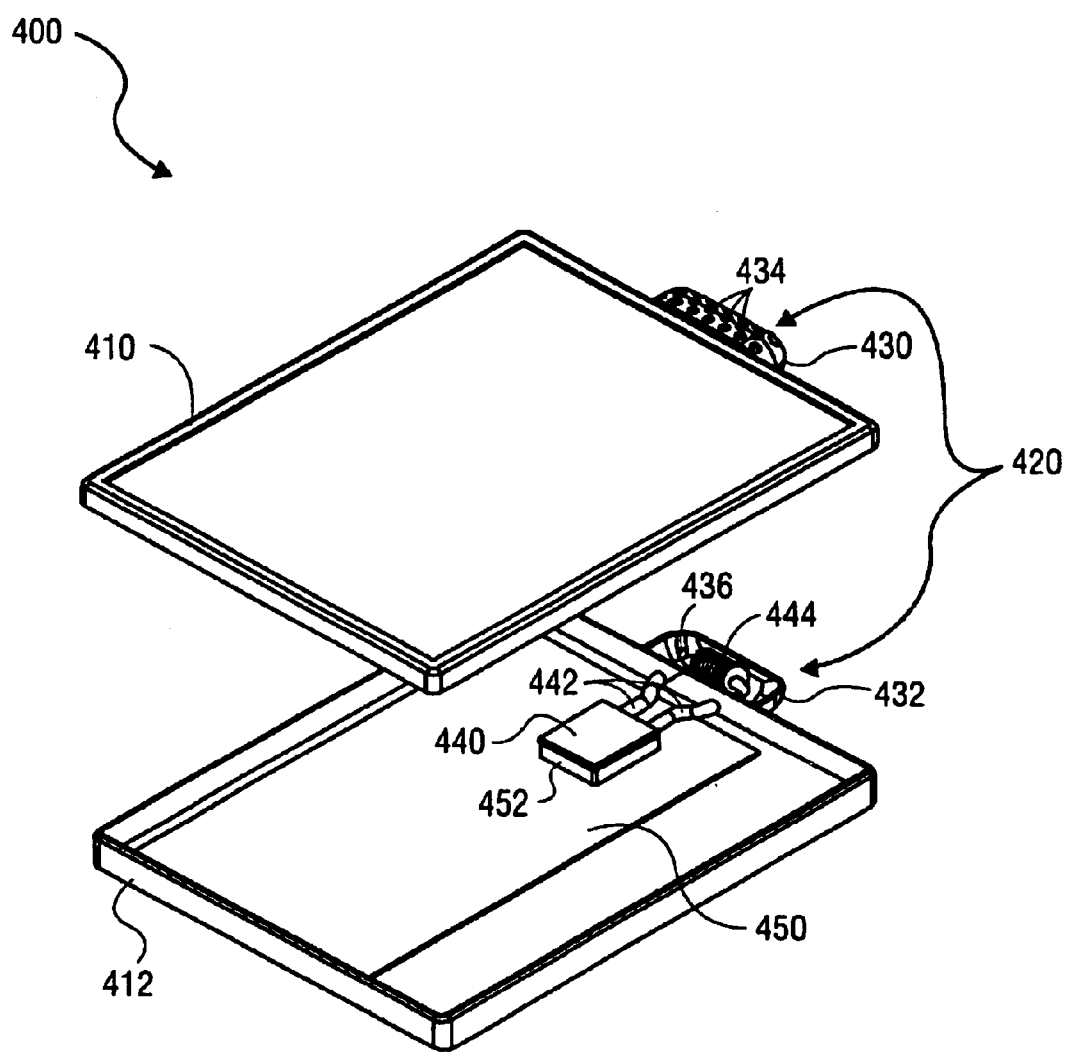
FIG. 4 is a perspective view of another embodiment with portions of the outer casing separated to reveal internal components.

FIG. 4 is a perspective view of an embodiment with portions of the outer casing separated to reveal components of an internal cooling apparatus. In a manner corresponding to the embodiment depicted in FIG. 2, handheld device 400 is comprised of casing parts 410 and 412 forming a substantially flat and rectangular casing that encloses electronic circuitry, including circuit board 450 and component 452. Portions 430 and 432 of casing parts 410 and 412 extend beyond the substantially rectangular shape of the casing to form extension 420 with holes 434 and 436 to facilitate the function of a cooling apparatus comprised of evaporator 440, tubing 442 and condenser 444.

In a manner corresponding to the embodiment depicted in FIG. 3, this cooling apparatus aids in the cooling of component 452. The location and/or orientation of extension 420 and/or holes 434 and 436 may be such as to facilitate dissipation by convection to the environment external to handheld device 400 of heat transferred by the cooling apparatus from component 452.

Figure 5:
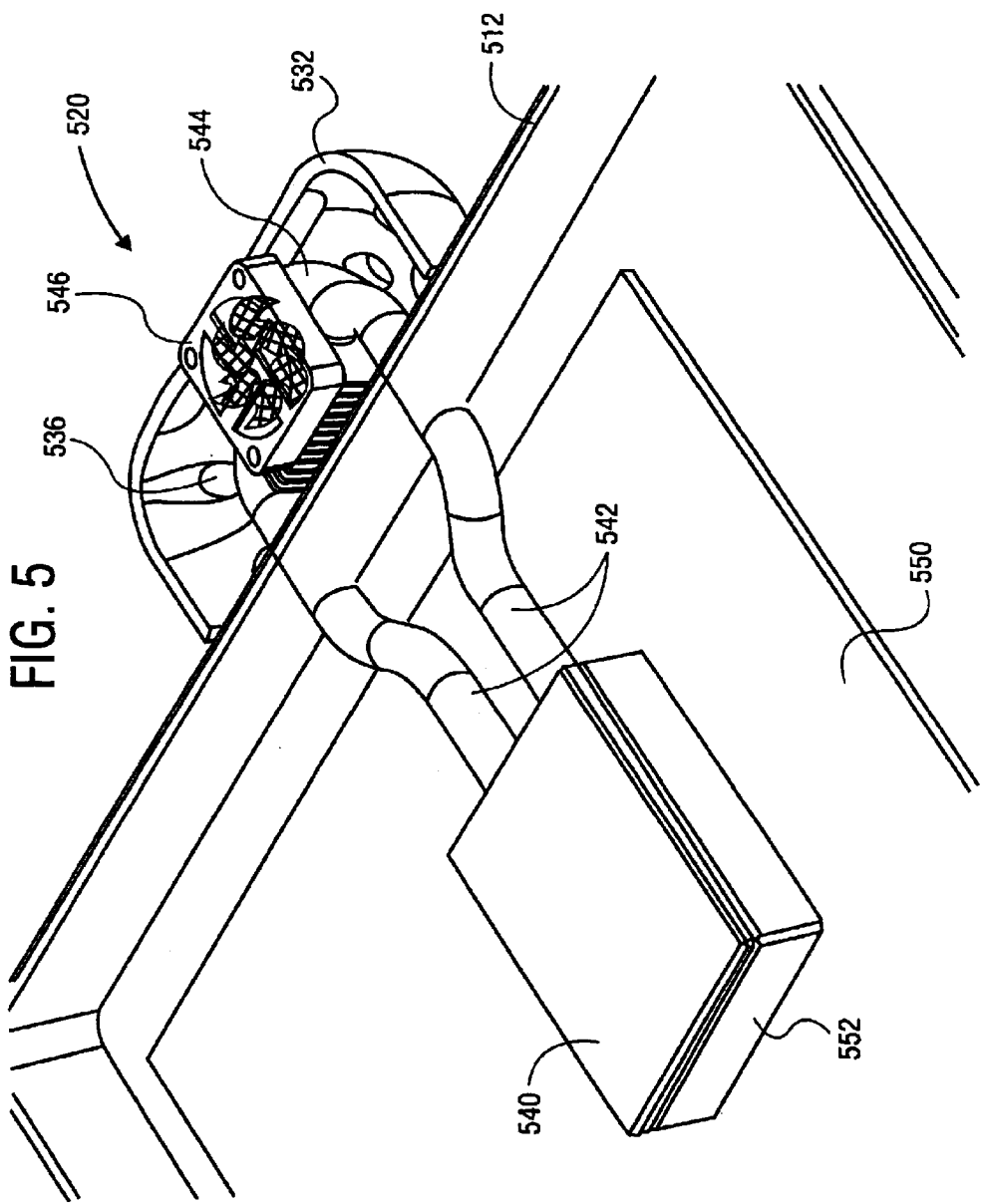
FIG. 5 is a perspective view of portions of an embodiment with portions removed to reveal internal components of a cooling apparatus.

FIG. 5 is a perspective view of a portion of an embodiment with portions removed to reveal components of an internal cooling apparatus. In a manner corresponding to the embodiment depicted in FIG. 4, casing part 512 is part of a casing that encloses electronic circuitry, including circuit board 550 and component 552. Portion 532 of casing part 512 extends beyond the substantially rectangular shape of casing part 512 to form part of extension 520 with holes 536 to facilitate the function of a cooling apparatus comprised of evaporator 540, tubing 542, condenser 544 and fan 546.

In a manner corresponding to the embodiment depicted in FIG. 4, this cooling apparatus aids in the cooling of component 552. The location and/or orientation of extension 520 and/or holes 536 may be such as to optimally direct the flow of air caused by fan 546 to further aid in dissipation to the environment external to handheld device 500 of heat transferred by the cooling apparatus from component 552.

Figure 6:
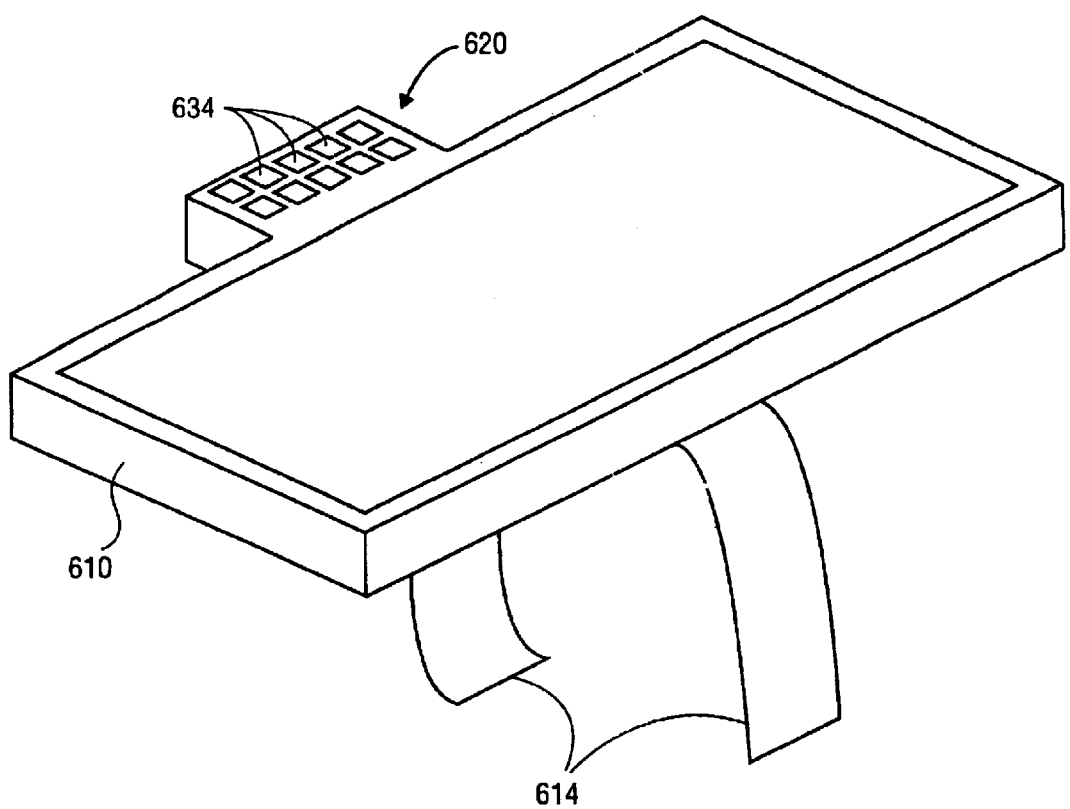
FIG. 6 is a perspective view of still another embodiment.

FIG. 6 is a perspective view of still another embodiment of the present invention. Handheld device 600 is comprised of casing part 610 forming a substantially flat and rectangular casing that encloses electronic circuitry (not shown) within, extension 620 that extends beyond the substantially rectangular shape of the casing, and straps 614 to enable the strapping of handheld device 600 to the wrist, arm or other portion of the body of a user of handheld device 600. Holes 634 provided on the external surface of extension 620 to facilitate the functioning of a cooling apparatus (not shown), to aid in the cooling of at least one component of the electronic circuitry within handheld device 600. Depending on the functions intended to be performed by handheld device 600, one or more external surfaces of the casing may carry buttons, a display device, knobs, dials, a touch-sensitive pad, and/or other forms of apparatus to enable interaction by a user of handheld device 600.

In a manner similar to the embodiments depicted in FIGS. 1 and 2, the location and/or orientation of extension 620 and/or holes 634 may be such as to facilitate dissipation by convection to the environment external to handheld device 600 of heat transferred by the cooling apparatus from at least one component of the electronic circuitry within handheld device 600. Alternatively, a fan or blower (not shown) may be used within or near extension 620 to further facilitate dissipation to the environment of such transferred heat.

Also in a manner similar the embodiment depicted in FIGS. 1 and 2, the location and/or orientation of extension 620 and/or holes 634 may also be chosen to minimize contact between the cooling apparatus or the heat dissipated by the cooling apparatus and a user of handheld device 600. Furthermore, the location and/or orientation of extension 620 and/or holes 634 may also be chosen to maximize access to the ambient air of the environment external to handheld device 600. This may be done by choosing a location for extension 620 that tends to cause it to protrude into the ambient air and/or away from contact with a user of handheld device 600 when handheld device 600 is being used by the user as intended. This normal use may be either as handheld device 600 is held in the hand of a user, or as handheld device is strapped to some part of a user's body.

Though not shown in the embodiment depicted in FIG. 6, extension 620 may also provide a location in which may be carried one or more controls, such as buttons, lights or other devices to facilitate interaction with a user of handheld device 600. In alternate embodiments, extension 620 may provide a mounting location for an antenna and/or optical emitter or receiver to facilitate either radio frequency or optical communication. In still other alternate embodiments, extension 620 may house or provide a mounting location for one or more electrical connectors by which handheld device 600 may be attached to other devices and/or to a power source.

Figure 7:
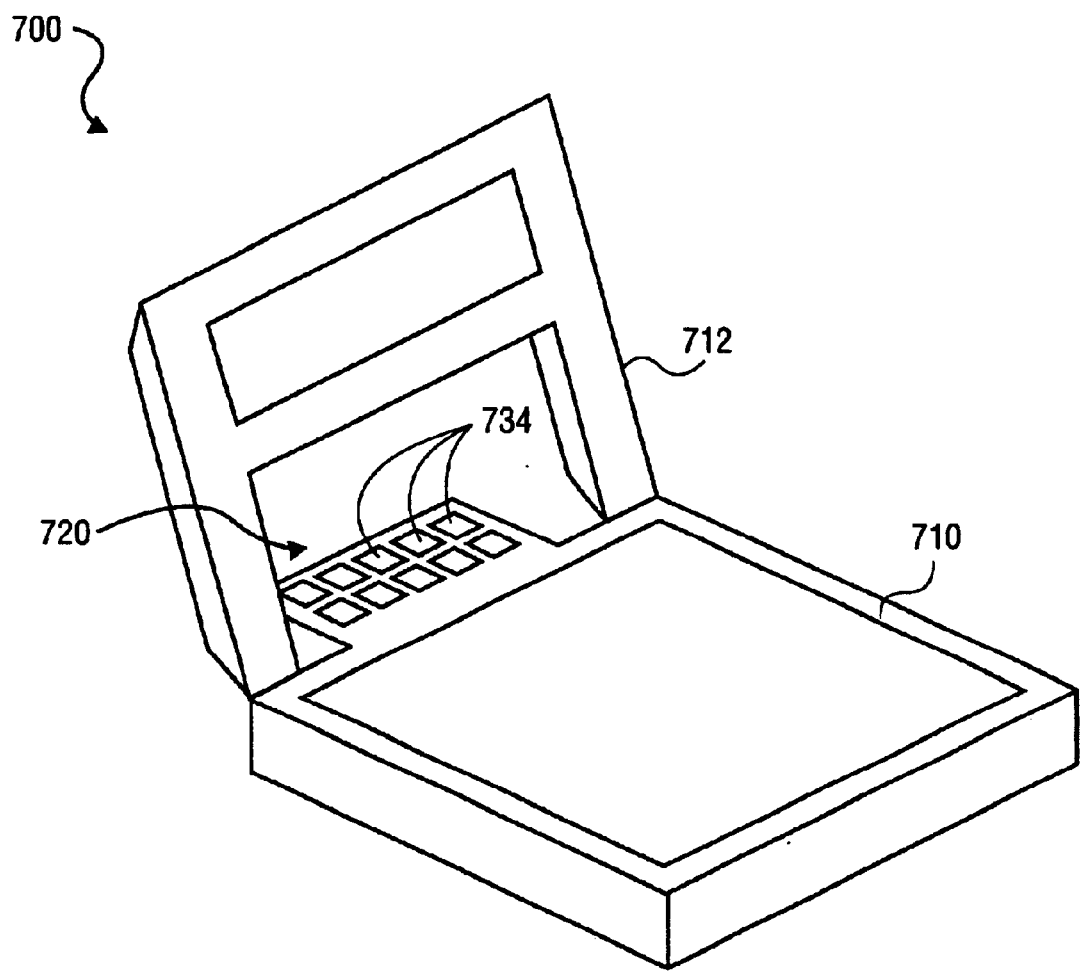
FIG. 7 is a perspective view of yet another embodiment.

FIG. 7 is a perspective view of yet another embodiment of the present invention. Handheld device 700 is comprised of casing base 710 and casing top 712 forming what is commonly called a "clamshell" casing wherein casing top 712 and casing base 710 are connected by at least one hinge, and casing top 712 can be folded over casing base 710, thereby substantially covering at least one external surface of each of casing top 712 and casing base 710. Handheld device 700 is shown with casing top 712 in what is commonly called the "unfolded" position. A portion of casing base 710 protrudes beyond the point at which casing base 710 is connected by a hinge to casing top 712, forming extension 720. Holes 734 are provided on the external surface of extension 720 to facilitate the functioning of a cooling apparatus (not shown), to aid in the cooling of at least one component of the electronic circuitry within handhled device 700. Depending on the functions intended to be performed by handhled device 700, one or more external surfaces of the casing may carry buttons, a display device, knobs, dials, a touch-sensitive pad, and/or other forms of apparatus to enable interaction by a user of handheld device 700.

In a manner similar to the embodiments depicted in FIGS. 1, 2 and 6, the location and/or orientation of extension 720 and/or holes 734 may be such as to facilitate dissipation by convection to the environment external to handheld device 700 of heat transferred by the cooling apparatus from at least one component of the electronic circuitry within handheld device 700. Alternatively, a fan or blower (not shown) may be used within or near extension 720 to further facilitate dissipation to the environment of such transferred heat.

Also in a manner similar the embodiment depicted in FIGS. 1, 2 and 6, the location and/or orientation of extension 720 and/or holes 734 may also be chosen to minimize contact between the cooling apparatus or the heat dissipated by the cooling apparatus and a user of handheld device 700. Furthermore, the location and/or orientation of extension 720 and/or holes 734 may also be chosen to maximize access to the ambient air of the environment external to handheld device 700. This may be done by choosing a location for extension 720 that tends to cause it to protrude into the ambient air and/or away from contact with a user of handheld device 700 when handheld device 700 is being used by the user as intended. This normal use may be with the casing top 712 in an "open" or "closed" position relative to casing base 710.

Though not shown in the embodiment depicted in FIG. 7, extension 720 could alternatively be formed as an extension of casing top 712, perhaps protruding beyond a surface of casing top 712 that is opposite a surface of casing top 712 that is adjacent to where a hinge connects casing top 712 to casing base 710. In still another alternative, extension 720 could be integrated with the hinge connecting casing top 712 to casing base 710. In such an alternative, holes 734 may be located such that holes 734 are covered when casing top 712 is in a "closed" position relative to casing base 710.

The invention has been described in conjunction with the preferred embodiment. It is evident that numerous alternatives, modifications, variations and uses will be apparent to those skilled in the art in light of the foregoing description. Although the invention has been discussed repeatedly as being practiced using a form of liquid-based cooling system, it will be understood by those skilled in the art that the present invention may be practiced using a variety of different cooling systems making use of a variety of cooling and/or heat transfer technologies without departing from the spirit or scope of the present invention as hereinafter claimed. Such technologies may include, but are not limited to, liquid coolants, thermoelectric technology, vapor compression systems (similar to what is often found in common household appliances), gas compression systems (e.g., Stirling or Brayton type cooling systems) where changes in the phase of a gas are used to effect cooling, or capillary pump loop systems which offer the benefit of no moving parts.

Furthermore, although the example embodiments of the present invention are described in the context of cooling down a component of a handheld device to allow increases in the performance of such a component, it will be understood by those skilled in the art that such cooling of a handheld device may be performed for other reasons, including counteracting the effects of operating a handheld device in an environment with temperatures high enough to have an undesirable impact on the normal function of such a components within such a handheld device.

Finally, although the example embodiments have depicted casings of a largely flat and/or rectangular configuration, those skilled in the art will appreciate that a handheld device may be of any conceivable shape or configuration that may be held in the hand of a user of the handheld device. Also, although the example embodiments have depicted extensions of casings that make use of holes to enable the dissipation of heat from a portion of a cooling system contained within the extension, those skilled in the art will understand that other forms of physical barriers may be used that allow the passage of air to and from the environment external to a handheld device, such as slots formed in the external surface of the extension, wire mesh grills, lattice work formed of either a metallic or non-metallic material, etc.

What is claimed is:

1. An apparatus, comprising:

an electronic component;

a cooling apparatus to dissipate heat from the electronic component into the environment external to the apparatus;

a casing small enough to be held with one hand that encloses the electronic component; and an extension formed on the casing that encloses at least one portion of the cooling apparatus.

2. The apparatus of claim 1, wherein the extension is located on the casing to enable heat from the electronic component to be dissipated to the environment external to the apparatus through convection.

3. The apparatus of claim 1, further comprising a fan within the extension to cause air from the environment external to the apparatus to move through the at least one portion of the cooling apparatus.

4. The apparatus of claim 1, wherein the electronic component is a microprocessor.

5. The apparatus of claim 1, wherein the cooling apparatus is comprised of an evaporator to collect heat from the electronic component and a condenser within the extension to dissipate the heat collected from the electronic component to the environment external to the apparatus.

6. The apparatus of claim 5, wherein liquid coolant is used in the cooling apparatus.

7. The apparatus of claim 1, further comprising controls carried by the extension to enable interaction between the apparatus and a user of the apparatus.

8. The apparatus of claim 1, further comprising an antenna protruding from the extension to enable radio frequency communication.

9. The apparatus of claim 1, further comprising an antenna within the extension to enable radio frequency communication.

10. The apparatus of claim 1, further comprising an optical transmitter within the extension to enable optical communication.

11. The apparatus of claim 1, wherein the casing is further comprised of a hinge connecting another part of the apparatus and the extension is integrated with the hinge.

12. The apparatus of claim 1, further comprising straps to enable the apparatus to be strapped to a part of the body of a user of the apparatus.

13. A method, comprising:

forming an extension on the casing of an apparatus, the apparatus being small enough to be held with one hand, and being comprised of an electronic component; and providing a cooling apparatus, at least one portion of which is carried within the extension, to dissipate heat from the electronic component to the environment external to the apparatus.

14. The method of claim 13, further comprising locating the extension on the casing to enable heat from the electronic component to be dissipated to the environment external to the apparatus through convection.

15. The method of claim 13, further comprising providing a fan within the extension to cause air from the environment external to the apparatus to move through the at least one portion of the cooling apparatus.

16. The method of claim 13, wherein the electronic component is a microprocessor.

17. The method of claim 13, wherein the cooling apparatus is comprised of an evaporator to collect heat from the electronic component and a condenser within the extension to dissipate the heat collected from the electronic component to the environment external to the apparatus.

18. The method of claim 17, wherein liquid coolant is used in the cooling apparatus.

19. The method of claim 13, further comprising providing abase for an antenna within the extension.

20. The method of claim 13, further comprising locating the extension on the casing such that the extension is integrated with a hinge on the casing that connects the casing to another part of the apparatus.

21. The method of claim 13, wherein the apparatus is further comprised of straps to enable the apparatus to be strapped to a part of the body of a user of the apparatus.

22. An apparatus, comprising:

an extension formed on the casing of a device small enough to be held with one hand; and at least one portion of a cooling apparatus enclosed within the extension to dissipate heat from an electronic component within the device into the environment external to the device.

23. The apparatus of claim 22, wherein the apparatus is located on the casing to enable heat from the electronic component to be dissipated to the environment external to the device through convection.

24. The apparatus of claim 22, further comprising a fan to cause air from the environment external to the device to move through the at least one portion of the cooling apparatus.

25. The apparatus of claim 22, wherein the electronic component is a microprocessor.

26. The apparatus of claim 22, wherein the at least one portion of the cooling apparatus is comprised of a condenser to dissipate the heat collected from the electronic component to the environment external to the device.

27. The apparatus of claim 26, wherein liquid coolant is used in the cooling apparatus.

28. The apparatus of claim 22, further comprising controls carried by the apparatus to enable interaction between the device and a user of the device.

29. The apparatus of claim 22, further comprising an antenna to enable radio frequency communication.

30. The apparatus of claim 22, further comprising an optical transmitter to enable optical communication.

* * * * *